United States Patent
Borke et al.

(10) Patent No.: US 6,936,655 B2
(45) Date of Patent: Aug. 30, 2005

(54) CROSSLINKABLE FLAME RETARDANT WIRE AND CABLE COMPOSITIONS HAVING IMPROVED ABRASION RESISTANCE

(75) Inventors: Jeffrey S. Borke, Middletown, OH (US); Steven W. Horwatt, West Chester, OH (US)

(73) Assignee: Equistar Chemicals, LP, Houston, TX (US)

(*) Notice: Subject to any disclaimer, the term of this patent is extended or adjusted under 35 U.S.C. 154(b) by 100 days.

(21) Appl. No.: 10/653,514

(22) Filed: Sep. 2, 2003

(65) Prior Publication Data

US 2005/0049343 A1 Mar. 3, 2005

(51) Int. Cl.$^7$ ................................. C08L 43/00
(52) U.S. Cl. ................. 524/521; 524/547; 525/240; 525/209
(58) Field of Search ................ 525/240, 209; 524/521, 547

(56) References Cited

U.S. PATENT DOCUMENTS

| | | | |
|---|---|---|---|
| 3,225,018 A | | 12/1965 | Zutty |
| 3,392,156 A | | 7/1968 | Donaldson |
| 3,646,155 A | * | 2/1972 | Scott .......................... 525/288 |
| 4,797,323 A | * | 1/1989 | Wu et al. .................... 428/389 |
| 5,266,627 A | | 11/1993 | Meverden et al. |
| 5,312,861 A | * | 5/1994 | Meverden et al. .......... 524/521 |
| 5,439,965 A | | 8/1995 | Horwatt et al. |
| 6,486,270 B1 | | 11/2002 | Garrison et al. |

* cited by examiner

Primary Examiner—Robert D. Harlan
(74) Attorney, Agent, or Firm—Gerald A. Baracka; William A. Heidrich

(57) ABSTRACT

Moisture curable flame retardant wire and cable formulations having improved abrasion resistance are provided. The compositions are comprised of a high density silane-containing polyethylene base resin which can be a blend of a bimodal HDPE and ethylene-silane copolymer or silane-grafted bimodal HDPE in combination with a flame retardant and silanol condensation catalyst.

17 Claims, No Drawings

CROSSLINKABLE FLAME RETARDANT WIRE AND CABLE COMPOSITIONS HAVING IMPROVED ABRASION RESISTANCE

BACKGROUND OF THE INVENTION

1. Field of the Invention

The present invention relates to improved flame retardant insulation compositions for wire and cable products. More specifically, the insulation compositions of the invention exhibit improved abrasion resistance and are comprised of a bimodal high density silane-containing polyethylene base resin formulated with a flame retardant compound and silanol condensation catalyst.

2. Description of the Prior Art

In addition to having good processability and flame retardance automotive wire and cable compositions must also have and retain over their service life certain physical characteristics. One physical property which has become increasingly important in recent years, due to ever more stringent service requirements, is abrasion resistance. Even though currently available compositions may satisfy the requirements of SAE J1128 which utilizes a sandpaper abrasion test, these same compositions may fail to meet the abrasion requirements of ISO 6722, Section 9.2. This latter specification has been adopted by most European car manufactures and utilizes a much more demanding needle abrasion test.

For example, crosslinkable flame retardant ethylene-vinylacetate (EVA) copolymer insulation compositions are disclosed in U.S. Pat. No. 5,439,965. The compositions, obtained by formulating EVA copolymers of specified vinyl acetate contents with halogenated compounds, antimony trioxide and organic peroxide, have improved sandpaper abrasion resistance (determined in accordance with ASTM D 3389); however, they will not meet the more stringent requirements of ISO 6722, Section 9.2.

Crosslinkable silane polymer compositions are also used for wire and cable insulation. Silane polymers used for this technology can be obtained by grafting unsaturated alkoxysilanes to ethylene polymers as described in U.S. Pat. No. 3,646,155 or by copolymerizing ethylene with an unsaturated alkoxysilane as described in U.S. Pat. Nos. 3,225,018 and 3,392,156. Filled moisture curable silane copolymer compositions of the latter type are disclosed in U.S. Pat. Nos. 5,266,627 and 5,312,861.

It would be highly useful if moisture curable silane-based insulation compositions having improved abrasion resistance were available. It would be even more advantageous if the silane-based compositions met the needle abrasion resistance requirements of ISO 6722, Section 9.2. These and other objectives are achieved with the improved compositions of the invention.

SUMMARY OF THE INVENTION

Improved flame retardant compositions useful for insulating wire and cable products are provided. The compositions, which are crosslinkable upon exposure to moisture, have significantly improved abrasion resistance and are comprised of a high density silane-containing polyethylene base resin, which is a blend of a bimodal high density polyethylene resin with an ethylene-silane copolymer or a bimodal high density polyethylene resin grafted with a silane monomer, a flame retardant and a silanol condensation catalyst.

More specifically, the crosslinkable flame retardant insulation compositions of the invention are comprised of 30 to 90 weight percent, based on the weight of the total composition, high density silane-containing polyethylene base resin selected from the group consisting of blends of bimodal high density polyethylene resins with ethylene-silane copolymers and bimodal high density polyethylene resins grafted with silane monomers; 5 to 70 weight percent, based on the weight of the total composition, flame retardant; and 0.01 to 1 weight percent, based on the weight of the total composition, silanol condensation catalyst. Optionally, the compositions can also contain 0.1 to 2 weight percent stabilizer or stabilizer combination which is preferably a hindered phenol or hindered phenol mixture.

Bimodal high density resins which can be blended or grafted to obtain the base resin are copolymers of ethylene and $C_{3-8}$ α-olefins having densities from 0.940 to 0.960 g/cm³. They are further characterized by having a melt flow ratio from 50 to 300 and ratio of weight average molecular weight to number average molecular weight from 15 to 30. When blended, the bimodal resin is combined with the ethylene-silane copolymer at a weight ratio from 4:1 to 1:4. Preferred ethylene-silane copolymers have 0.1 to 20 weight percent vinyltrialkoxysilane copolymerized with the ethylene. Copolymers of ethylene with vinyltrimethoxysilane or vinyltriethoxysilane are especially useful. When the base resin is grafted, these same silane monomers are grafted onto the bimodal polyethylene.

Halogenated flame retardants are preferably employed. Brominated aromatic compounds of the formula

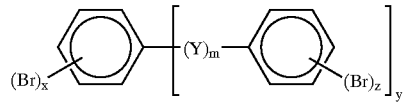

wherein x is 3 to 6; z is 3 to 5; m is zero or 1; y is zero or 1; and Y is oxygen or a bivalent aliphatic radical of the formula $(C_nH_{2n})$ where n is an integer of 1 to 6 are particularly useful. It is even more advantageous when the brominated aromatic compound is employed with an inorganic synergist compound and the weight ratio of brominated aromatic compound to inorganic synergist is from 1:1 to 5:1. Antimony trioxide is the preferred synergist.

Silanol condensation catalysts include compounds selected from the group consisting of organic bases, carboxylic acids and organometallic compounds and tin carboxylates, such as dibutyltindilaurate and dioctyltinmaleate, are particularly advantageous.

DETAILED DESCRIPTION OF THE INVENTION

The present invention relates to improved flame retardant wire and cable insulation compositions. The compositions are moisture curable and exhibit significantly improved abrasion resistance and are comprised of high density, bimodal, silane-containing base resin, a flame retardant compound and silanol condensation catalyst. The compositions also typically contain an antioxidant or combination of antioxidants.

Whereas moisture curable silane polymer compositions are known, significant improvement in abrasion resistance has unexpectedly been achieved by the use of specific high density polyethylene (HDPE) resins having a broad bimodal molecular weight distribution comprising a high molecular weight component and a low molecular weight component.

These HDPE resins, referred to herein as bimodal HDPE resins, have densities from 0.940 to 0.960 g/cm³ and, more preferably from 0.942 to 0.955 g/cm³.

The bimodal HDPE resins are copolymers of ethylene with minor amounts of $C_{3-8}$ α-olefins, preferably butene-1, hexene-1 and octene-1. Typically the copolymers are comprised of 85 to 98 weight percent (wt. %) and, more preferably 90 to 98 wt. %, recurring units of ethylene and 2 to 15 wt. % and, more preferably, 2 to 10 wt. % recurring units of $C_{3-8}$ α-olefin. The bimodal HDPE resins are produced by conducting the polymerization in multiple, most typically two, reaction zones using Ziegler catalysts. When two reaction zones are employed the process is generally carried out by polymerizing the monomers in a first reaction zone under conditions which promote formation of lower molecular weight species and, after removing volatile materials to reduce the hydrogen concentration, transferring the polymer to a second reactor and continuing the polymerization under conditions which promote the formation of higher molecular weight species. Such a multiple zone polymerization process for preparing high molecular weight bimodal polyethylene resins is described in U.S. Pat. No. 6,486,270 which is incorporated herein by reference.

The HDPE resins employed for the invention have a broad bimodal molecular weight distribution. Molecular weight and molecular weight distribution can be measured by gel permeation chromatography (GPC). Alternatively, the molecular weight distribution (MWD) can be indicated by melt indices. Melt index ($MI_2$) is usually used to measure the molecular weight and melt flow ratio (MFR) to measure the molecular weight distribution. A larger $MI_2$ indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure. Bimodal HDPEs used for the invention have MFRs from about 50 to 300 and, more preferably, from about 75 to 250. The ratio of weight average molecular weight to number average molecular weight ($M_n/M_w$) of these resins, as determined by GPC, will be from about 15 up to about 30.

Bimodal HDPEs of the above types are utilized to obtain the silane-containing polyethylene base resin used for the improved compositions of the invention—either by blending the bimodal HDPE with an ethylene-silane copolymer or by grafting the bimodal HDPE with a silane monomer.

When the base resin is a blend of bimodal HPDE and ethylene-silane copolymer the components will be blended at a weight ratio from 4:1 to 1:4 (bimodal HDPE:silane copolymer) and, more preferably, at a weight ratio of 2:1 to 1:2. Silane copolymers which can be used are copolymers of ethylene with ethylenically unsaturated silane compounds having 2 or 3 alkoxy substituents. The silane copolymers can have the ethylenically unsaturated silane compound incorporated into the polymer chain by copolymerization or attached to the polymer chain by grafting. Illustrative ethylenically unsaturated silanes of the above types include gamma-methacryloxypropyltrimethoxysilane, vinyltris(2-methoxyethoxy)silane, vinyltrimethoxysilane, vinyltriethoxysilane and the like.

Ethylene copolymers with vinyltrialkoxysilanes of the formula $H_2C=CHSi(OR)_3$ where R is a $C_{1-4}$ alkyl group are particularly useful for blending with the bimodal HDPE. Copolymers of vinyltrimethoxysilane (VTMOS), i.e., where R is a methyl group, and vinyltriethoxysilane (VTEOS), where R is an ethyl group, are especially advantageous. The amount of vinylalkoxysilane copolymerized or grafted can range from 0.1 to 20 wt. % and, more preferably, will be in the range 0.25 to 7.5 wt. %. Useful silane copolymers generally have MIs from 0.01 to 20 g/10 min.; however, MIs preferably range from 0.05 to 15 g/10 min. MIs are determined in accordance with ASTM D 1238-01, condition 190/2.16.

Ethylene-silane copolymers obtained by grafting are disclosed in U.S. Pat. No. 3,646,155 which is incorporated herein by reference. Ethylene-silane copolymers obtained by copolymerizing ethylene with ethylenically unsaturated alkoxysilanes are disclosed in U.S. Pat. Nos. 3,225,018 and 3,392,156 which are incorporated herein by reference.

One or more other olefins may also be present with the ethylene and vinyltrialkoxysilane. α-Olefin comonomers are especially useful. When present, these comonomers may constitute up to 20 wt. % of the silane copolymer but are more preferably present in amounts less than 10 percent. Illustrative comonomers which can be present with the ethylene and vinyltrialkoxysilane include: α-olefins such as propylene, butene-1, hexene-1 and octene-1; vinyl esters such as vinyl acetate and vinyl butyrate; carboxylic acids and their esters such as methacrylic acid, acrylic acid, methyl acrylate and methyl methacrylate; vinyl ethers such as methyl vinyl ether; acrylonitrile; and the like.

Highly useful blends of the above types for the compositions of the invention are blends of bimodal HDPE with copolymers of ethylene and 1 to 5 wt. % VTMOS wherein the wt. ratio of bimodal HDPE:silane copolymer is from 2:1 to 1:2. Even more preferred are blends wherein the bimodal HDPE has a density of 0.942 to 0.955 g/cm³ and MFR from 75 to 250.

The bimodal silane-containing base resins utilized for the improved compositions of the invention may alternatively be obtained by grafting the bimodal HDPE with an ethylenically unsaturated silane compound. Any of the ethylenically unsaturated silanes previously described to obtain the silane copolymers can be used for this purpose and bimodal HDPEs grafted with vinyltrialkoxysilanes are particularly advantageous. The bimodal HDPE may be grafted utilizing procedures such as those described in U.S. Pat. No. 3,646,155. Bimodal HDPE having a density of 0.940 to 0.960 g/cm³ grafted with 0.1 to 20 wt. % VTMOS or VTEOS is highly useful. Even more preferred for the compositions of the invention are grafts of bimodal HDPEs having densities of 0.942 to 0.955 g/cm³ and VTMOS or VTEOS contents of 0.25 to 7.5 wt. %.

The base resin, whether a bimodal HDPE blend or graft, comprises from 30 to 90 wt. % of the inventive composition. More preferably, the high density silane-containing polyethylene base resin constitutes from 40 to 85 wt. % of the abrasion resistant insulation composition.

Known flame retardant compounds are utilized to impart flame retardancy. Such compounds can include hydrated inorganic fillers, intumescents, halogenated organic compounds, with and without inorganic filler synergists, and combinations thereof. The end use application will dictate the degree of flame retardancy required and therefore the amount and type of flame retardant compound(s) to be used. In general the flame retardant will comprise 5 to 70 wt. % and, more preferably, 10 to 55 wt. % of the total composition.

Hydrated inorganic fillers, which impart flame retardancy by releasing water of hydration during combustion or ignition, include hydrated alumina, hydrated magnesia, hydrated calcium silicate, hydrated magnesium carbonate and the like. Hydrated alumina (ATH) is generally preferred.

Useful intumescent flame retardant systems typically consist of three basic ingredients: a catalyst, a charring agent and a blowing agent. In combination, these three components induce charring and foaming of the base polymer during thermal degradation, forming a blown protective cellular char which inhibits flame. Catalysts are typically phosphorus derivatives, most commonly ammonium polyphosphate, but certain sulphur derivatives can also be used. Charring agents can include various iron compounds, pentaerythritol phosphates, melamine, and others. Blowing agents can include materials such as urea, melamine, dicyandiamide, and their derivatives.

In a preferred embodiment at least one halogenated organic flame retardant additive is employed for the insulation compositions of the invention. Useful halogenated organic compounds have at least one halogen atom, preferably bromine or chlorine, bonded to an aromatic or cycloaliphatic ring which can be monocyclic, bicyclic or multicyclic rings. Bromine is the preferred halogen. The halogenated compound may contain other functional groups which do not adversely affect the processing or physical characteristics of the composition.

Examples of halogenated compounds of the above type include perchloropentacyclodecane; Diels-Alder adducts of hexachlorocyclopentadiene with "enes" such as maleic anhydride; hexabromobenzene; pentabromoethylbenzene 2,4,6-tribromophenol; tribromophenyl allyl ether; octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylenebis(tetrabromophthatmide); hexabromocyclododecane; and the like In a highly useful class of the halogenated compounds for the invention are brominated aromatic compounds corresponding to the general formula

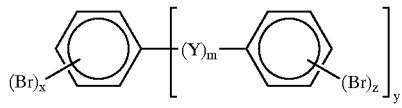

wherein x is 3 to 6; z is 3 to 5; m is zero or 1; y is zero or 1; and Y is oxygen or a bivalent aliphatic radical of the formula $(C_nH_{2n})$ where n is 1 to 6. Preferred within the meaning of Y are the following:

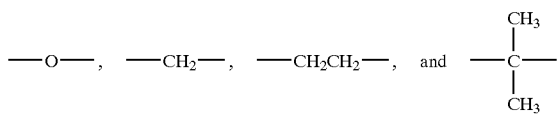

To minimize the amount of the flame retardant compound used, halogenated compounds with high halogen contents are advantageously employed. It is particularly desirable when brominated aromatic compounds having bromine contents greater than 65 percent and, more preferably, greater than 75 percent are utilized. In a highly useful embodiment, the flame retardant compound is decabromodiphenyl ether or ethane-1,2-bis(pentabromophenyl).

It is generally preferred to include an inorganic synergist compound when halogenated flame retardants are used. While it is possible to obtain useful formulations without a synergist, flame retardance is increased when they are included and it is generally possible to use lower levels of the halogenated compound. This latter feature is advantageous from an economic standpoint and also from the standpoint of maximizing the physical properties and processability. While antimony trioxide is the inorganic synergist of choice, other known synergists include antimony pentoxide, antimony silicates, boron compounds, tin oxide, zinc oxide, zinc borate, aluminum trioxide and aluminum trihydroxide. The weight ratio of halogenated compound to synergist typically ranges from about 1:1 up to about 5:1 and, more preferably, is between about 2.5:1 and about 4:1.

A silanol condensation catalyst is included in the formulations to promote crosslinking and insure moisture cure. Silanol condensation catalysts known in the art for crosslinking alkoxysilane polymers can be employed for the compositions of the invention. Such catalysts include organic bases, carboxylic acids and organometallic compounds including organic titanates and complexes or carboxylates of lead, cobalt, iron, nickel, zinc and tin, such as dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylates, especially dibutyltindilaurate and dioctyltinmaleate, are particularly useful silanol condensation catalysts for the compositions of the invention. The silanol condensation catalyst will be present in an amount from 0.01 to 1 wt. % and, more preferably, 0.025 to 0.75 wt. %, based on the total weight of the composition.

Conventional stabilizers are typically included in insulation compositions to provide oxidative and thermal stability during processing and over the life of the product. Hindered phenol compounds are commonly employed for this purpose by themselves or in conjunction with hindered amines, thio compounds, phosphites, mercaptoimidazoles or the like.

Useful hindered phenol compounds have one or more substituted phenyl groups of the formula

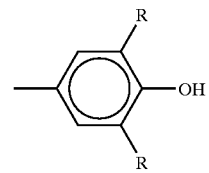

where R is a $C_{1-4}$ alkyl group and, most preferably, a tertiary butyl group. The R groups can be the same or different. Where more than one 3,5-dialkyl-4-hydroxyphenol group is present, they will be joined through a linking group and the resulting compounds will correspond to the formula

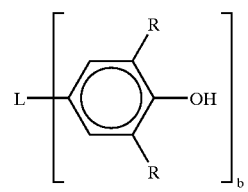

where b is from 2 to 4, L represents the linking group and R is the same as defined above.

Representative linking groups include:

-continued (b) 

(c) 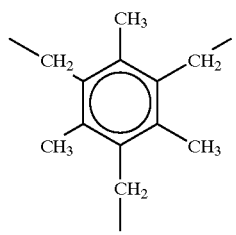

(d) 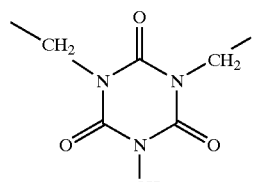

(e) —CH$_2$CH$_2$—$\overset{O}{\overset{\|}{C}}$NHNH$\overset{O}{\overset{\|}{C}}$—CH$_2$CH$_2$— and (f) —CH$_2$CH$_2$COCH$_2$CH$_2$—S—CH$_2$CH$_2$OCCH$_2$CH—.

It is particularly advantageous when the above-identified linking moieties are substituted with 3,5-di-t-butyl-4-hydroxyphenyl groups.

Especially useful hindered phenol compounds of the above types which can be employed as stabilizers for the compositions of the invention include:

4,4'-Methylenebis(2,6-di-t-butylphenol);
Tetrakis[methylene (3,5-di-t-butyl-4-hydroxyhydrocinnamate)]methane;
1,3,5-Trimethyl-2,4,6-tris(3,5-di-t-butyl-4-hydroxybenzyl)-benzene;
1,3,5-Tris(3,5-di-t-butyl-4-hydroxybenzyl)-s-triazine 2,4,6(1H,3H,5H) trione;
1,2-Bis(3,5-di-t-butyl-4-hydroxyhydrocinnamoyl) hydrazine;
Octadecyl 3,5-di-t-butyl-4-hydroxyhydrocinnamate; and
Thiodiethylene bis-(3,5-di-t-butyl-4-hydroxy) hydrocinnamate.

All of the foregoing materials are commercially available. For example, tetrakis[methylene (3,5-di-t-butyl-4-hydroxyhydrocinnamate)]methane and 1,2-bis(3,5-di-t-butyl-4-hydroxyhydrocinnamoyl)hydrazine are sold by Ciba-Geigy under the respective trademarks IRGANOX 1010 and IRGANOX 1024.

In another embodiment a hindered phenol is combined with a thioester such as pentaerythritol tetrakis (betalaurylthiopropionate), thiodiethylene bis(3,5-di-t-butyl-4-hydroxyhydrocinnamate), dilauryl-3,3'-thiodipropionate dimyristylthiodipropionate and bisalkyl sulfides. Still other stabilizers, e.g., polymerized 1,2-dihydro-2,2,4-trimethyl quinoline and tris(3,5-di-t-butyl-4-hydroxybenzyl)isocyanurate, may be used.

The stabilizer or stabilizer combination will generally constitute 0.1 to 2 wt. % and, more preferably, 0.2 to 1.5 wt. % of the total composition. The compositions can also contain other additives conventionally employed in wire and cable formulations of this type. Such additives are known in the art and are generally present in amounts cumulatively not exceeding 15 wt. %, based on the total composition. Such additives can include UV stabilizers, release agents, processing aids, nucleating agents, colorants, pigments, metal deactivators, lubricants, other polymers, and the like. These additives can be incorporated by direct blending or added as part of a masterbatch in a suitable carrier resin.

The compositions of the invention are prepared by melt compounding the ingredients. Prior to melt compounding all or a portion of the components may be dry blended to facilitate this operation. Also, a masterbatch containing the silanol condensation catalyst and/or other additives, such as antioxidants and the like, may be utilized to facilitate mixing with and incorporation in the silane-containing base resin.

The use of masterbatches to more effectively incorporate ingredients, particularly those used at low levels, into polyolefin resins is well known. This procedure is also useful since it minimizes the number of materials which must be stored and handled by processors. The procedure involves preparing a masterbatch, sometimes also referred to as a concentrate, having relatively high concentrations of the additives in a carrier resin in which the additives can be readily dispersed and which is compatible with the silane-containing base resin being used. The carrier resin used for the masterbatch is typically a polyolefin and, more preferably, a polyethylene resin having better processability than the silane-containing base resin.

The masterbatch, typically in pellet form or some other form suitable for storage and/or handling, is then "letdown" into the silane-containing base resin to which other ingredients may have already been added, in an amount calculated to achieve the desired level of the "letdown" additives in the final product.

Masterbatches utilized for the present invention generally utilize an ethylene homopolymer or copolymer as the carrier resin. The concentrates will contain 20 to 70 weight percent carrier resin and 30 to 80 weight percent additive components. The above weight percentages are based on the total weight of the masterbatch. Especially useful masterbatches are comprised of 20 to 60 wt. % carrier resin and 40 to 80 wt. % additive components.

Compositions of the invention are useful for general wire and cable applications where an insulation coating having a good balance of oxidative, thermal, abrasion and flame resistance is required on a conductor. The compositions are, however, particularly suitable for automotive under-the-hood applications where the wiring is exposed to elevated temperatures, mechanical abrasion due to vibration, and aggressive fluids such as oils, fuels, hydraulic fluids, etc.

Compositions which are especially useful for automotive applications and which form a preferred embodiment of the invention preferably contain 40 to 85 wt. % of a blend of bimodal HDPE having a density of 0.940 to 0.960 g/cm$^3$ with a copolymer of ethylene and 0.25 to 7.5 wt. % VTMOS, the weight ratio of bimodal HDPE to ethylene-VTMOS copolymer ranging from 2:1 to 1:2; 10 to 55 wt. % of a flame retardant consisting of a mixture of decabromodiphenyl ether or ethane-1,2-bis(pentabromoethyl) and antimony trioxide, the weight ratio of brominated compound to synergist ranging from 2.5:1 to 4:1; 0.025 to 0.75 wt. % dibutyltindilaurate; and 0.2 to 1.5 wt. % hindered phenol or hindered phenol mixture.

The following examples illustrate the improved abrasion resistant compositions of the invention. Those skilled in the art, however, will recognize numerous possible variations which are within the spirit of the invention and scope of the claims. All parts and percentages and ratios in the examples are on a weight basis unless otherwise indicated.

EXAMPLE 1

A crosslinkable flame retardant insulation composition was prepared in accordance with the invention. The composition was obtained by combining 65% base resin, 30% flame retardant masterbatch and 5% dibutyltindilaurate silanol condensation catalyst masterbatch. The base resin consisted of a 1:1 mixture of bimodal HDPE (density 0.949 g/cm$^3$; MI 0.075 g/10 min) and ethylene-VTMOS copolymer (density 0.9225 g/cm$^3$; MI 1.5 g/10 min; 1.7% VTMOS). The bimodal HDPE was a copolymer of ethylene with 1.1% hexene-1 produced by a dual reactor polymerization process. The flame retardant was a 3:1 mixture of ethane-1,2-bis(pentabromophenyl) and antimony trioxide and the flame retardant masterbatch consisted of 50% high density polyethylene (density 0.943 g/cm$^3$; MI 0.7 g/10 min) carrier resin and 50% flame retardant component. The silanol condensation catalyst masterbatch consisted of 92.6% low density polyethylene (density 0.919 g/cm$^3$; MI 4 g/10 min) carrier resin, 1.4% dibutyltindilaurate and 6% of an antioxidant mixture (5 parts tetrakis[methylene(3,5-di-t-butyl-4-hydroxyhydrocinnamate)]methane: 1 part 1,2-bis(3,5-di-t-butyl-4-hydroxyhydrocinnamoyl)hydrazine).

After blending the bimodal HDPE and silane copolymer, the flame retardant masterbatch and silanol condensation catalyst masterbatch were let down into the base resin and the composition extruded onto 22 AWG copper wire using a 2½ inch Davis-Standard extruder equipped with a general purpose polyethylene screw (L/D 20:1). The temperature profile of the extruder was Zone 1 340° F.; Zone 2 350° F., Zone 3 360° F.; Zone 4 370° F. and head temperature 380° F. The extruder line speed was 500 ft/min. Insulation thickness was 12 mils. The insulated wires were cured by immersing in a 95° C. water bath for 17 hours. The cured insulation samples had a tensile strength (ASTM D638) of 2900 psi, elongation (ASTM D 638) of 360%, and resistance to flame propagation (ISO 6722, Section 12) of 25 seconds.

Cured insulated wire samples were also evaluated for needle scrape abrasion in accordance with the procedure of ISO 6722, Section 9.2. This procedure utilizes an apparatus designed to abrade the surface of the insulation in both directions along the longitudinal axis of the wire and record the number of cycles until the needle abrades through the insulation and makes contact with the wire. The needle abrasion resistance of wire samples insulated with the composition of the invention was 379 cycles, a value considered well within acceptable limits by the industry. Additionally, the insulation samples meet the short-term aging requirements of ISO 6722, Section 10.

The suitability of the above-prepared insulation composition for automotive wire is apparent from the above data.

COMPARATIVE EXAMPLE A

To demonstrate the superior needle abrasion resistance obtained with the bimodal HDPE formulations of the invention, Example 1 was repeated except that the bimodal HDPE used for the base resin was replaced with a conventional HDPE produced in a single reactor using a Ziegler process. The HDPE was unimodal, having the typical bell-shaped MWD curve, and had a density of 0.943 g/cm$^3$ and MI of 0.7 g/10 min. The comparative insulation composition was prepared using identical amounts of the same silane copolymer, flame retardant masterbatch and silanol condensation catalyst masterbatch. Mixing, extrusion, curing and testing conditions were also identical to those described in Example 1. Whereas most of the physical properties of the comparative composition compared favorably with those of the product of Example 1, the needle abrasion resistance was only 317—significantly lower than that obtained with the bimodal HDPE composition of the invention.

EXAMPLE 2

When a composition is prepared in accordance with the formulation of Example 1 except that the ethane-1,2-bis (pentabromophenyl) is replaced with decabromodiphenyl ether, a flame retardant insulation composition having physical properties, including high resistance to needle abrasion, similar to that of Example 1 is obtained after moisture cure.

EXAMPLE 3

A flame retardant insulation composition is prepared in accordance with the procedure of Example 1 except that the bimodal HDPE resin is grafted with about 0.85% VTMOS to produce the base resin. Upon moisture cure, 22 AWG copper wires insulated with 12 mil and 16 mil thick layers of the insulation exhibit good needle abrasion resistance.

We claim:

1. A crosslinkable, flame retardant polyolefin insulation composition having improved abrasion resistance comprising:
   (a) 30 to 90 weight percent, based on the weight of the total composition, high density bimodal silane-containing polyethylene base resin selected from the group consisting of:
      (i) a blend of a bimodal high density polyethylene resin having a density of 0.940 to 0.960 g/cm$^3$, melt flow ratio from 50 to 300 and ratio of weight average molecular weight to number average molecular weight from 15 to 30 with an ethylene-silane copolymer and,
      (ii) a bimodal high density polyethylene resin having a density of 0.940 to 0.960 g/cm$^3$, melt flow ratio from 50 to 300 and ratio of weight average molecular weight to number average molecular weight from 15 to 30 grafted with a silane monomer;
   (b) 5 to 70 weight percent, based on the weight of the total composition, flame retardant; and
   (c) 0.01 to 1 weight percent, based on the weight of the total composition, silanol condensation catalyst.

2. The composition of claim 1 wherein the high density, bimodal silane-containing polyethylene base resin is a blend of a bimodal high density polyethylene resin and a copolymer of ethylene and 0.1 to 20 weight percent vinyltrialkoxysilane of the formula $H_2C=CHSi(OR)_3$ where R is a $C_{1-4}$ alkyl group, the weight ratio of said bimodal high density polyethylene resin to said ethylene-vinyltrialkoxysilane copolymer ranging from 4:1 to 1:4.

3. The composition of claim 2 wherein the bimodal high density polyethylene resin is a copolymer of ethylene and 2 to 15 weight percent $C_{3-8}$ α-olefin.

4. The composition of claim 3 wherein the bimodal high density polyethylene resin has a density from 0.942 to 0.955 g/cm$^3$.

5. The composition of claim 4 wherein the bimodal high density polyethylene resin is a copolymer of ethylene and 2 to 10 weight percent hexene-1.

6. The composition of claim 2 wherein the ethylene-vinyltrialkoxysilane copolymer is a copolymer of ethylene and 0.25 to 7.5 weight percent vinyltrimethoxysilane or vinyltriethoxysilane and has a melt index of 0.01 to 20 g/10 min.

7. The composition of claim 6 wherein the ethylene-vinyltrialkoxysilane copolymer is a copolymer of ethylene and 1 to 5 weight percent vinyltrimethoxysilane.

8. The composition of claim 2 wherein the weight ratio of the bimodal high density polyethylene resin to ethylene-vinyltrialkoxysilane copolymer is from 2:1 to 1:2.

9. The composition of claim 1 wherein the high density, bimodal silane-containing polyethylene base resin is a bimodal copolymer of ethylene and 2 to 15 weight percent $C_{3-8}$ α-olefin having a density of 0.942 to 9.55 g/cm$^3$, melt flow ratio from 50 to 300 and ratio of weight average molecular weight to number average molecular weight from 15 to 30 grafted with 0.1 to 20 weight percent vinyltrialkoxysilane of the formula $H_2C=CHSi(OR)_3$ where R is a $C_{1-4}$ alkyl group.

10. The composition of claim 9 wherein the bimodal copolymer is grafted with 0.25 to 7.5 weight percent vinyltrimethoxysilane or vinyltriethoxysilane.

11. The composition of claim of claim 1 wherein the flame retardant is a brominated aromatic compound of the formula

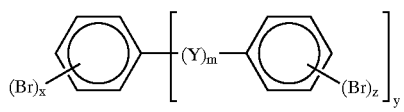

wherein x is 3 to 6; z is 3 to 5; m is zero or 1; y is zero or 1; and Y is oxygen or a bivalent aliphatic radical of the formula $(C_nH_{2n})$ where n is an integer of 1 to 6 and the silanol condensation catalyst is selected from the group consisting of organic bases, carboxylic acids and organometallic compounds.

12. The composition of claim 11 wherein the flame retardant is a brominated aromatic compound and an inorganic synergist compound and the weight ratio of brominated aromatic compound to inorganic synergist is from 1:1 to 5:1.

13. The composition of claim 12 wherein the brominated aromatic compound is decabromodiphenyl ether or ethane-1,2-bis(pentabromophenyl).

14. The composition of claim 11 wherein the silanol condensation catalyst is a tin carboxylate.

15. The composition of claim 11 wherein (a) is present from 40 to 85 weight percent, (b) is present from 10 to 55 weight percent and (c) is present from 0.025 to 0.75 weight percent.

16. The composition of claim 15 additionally containing from 0.1 to 2 weight percent stabilizer, based on the weight of the total composition.

17. The composition of claim 16 wherein the stabilizer is a hindered phenol or hindered phenol mixture and is present from 0.2 to 1.5 weight percent.

* * * * *